COOLING SYSTEM FOR POWER SUPPLY APPARATUS

Filed April 8, 1964 2 Sheets-Sheet 1

INVENTORS.
Michael A. Koltuniak
Thomas N. Urquhart
BY
Harness, Dickey & Pierce
ATTORNEYS.

COOLING SYSTEM FOR POWER SUPPLY APPARATUS

INVENTORS.
Michael A. Koltuniak.
Thomas N. Urquhart.
BY
Harness, Dickey & Pierce.
ATTORNEYS.

United States Patent Office 3,253,646
Patented May 31, 1966

3,253,646
COOLING SYSTEM FOR POWER SUPPLY APPARATUS

Michael A. Koltuniak, Warren, and Thomas N. Urquhart, Birmingham, Mich., assignors to The Udylite Corporation, Detroit, Mich., a corporation of Delaware
Filed Apr. 8, 1964, Ser. No. 358,292
5 Claims. (Cl. 165—39)

The present invention broadly relates to electrical power supply apparatuses, and more particularly to an improved system for cooling the components of a power supply system mounted within a sealed enclosure. More specifically, the present invention is applicable to an improved rectifier apparatus for supplying direct current incorporating a combination unit comprising an electrically conductive heat sink and heat exchanger through which a cooling liquid is circulated, effecting a removal of heat therefrom while concurrently effecting a cooling of air circulated within the rectifier unit effecting efficient cooling of the ancillary components contained therein.

A variety of electrical power apparatuses are in widespread commercial use which necessitate the provision of a cooling system to avoid an overheating of the components thereof in order to maintain optimum efficiency and a long operating life. The problem of providing adequate cooling of such power supply apparatuses is aggravated when such units are placed within hermetically sealed enclosures to protect them from exposure to corrosive atmospheres and contamination with dirt and extraneous deposits which may be present in the environment in which the apparatus is employed.

The problem of providing adequate cooling to the electrical components of D.C. rectifier apparatuses employed for supplying current to electroplating operations or the like, is particularly pronounced due to the high currents handled by such units and the desirability of providing a substantially hermetically sealed enclosure to protect the components thereof from the moist and corrosive atmospheres present in most electro-chemical treating processes. Various cooling techniques have heretofore been used or proposed for use for providing efficient cooling of the several components of such rectifier apparatuses. These prior techniques, however, have not been entirely satisfactory due to the complexity of the resulting unit, the relatively high cost of maintaining adequate cooling of the operating components therein, the necessity for increasing the size of the apparatus for accommodating the cooling system, and/or a reduction in the accessibility of the components within the unit substantially increasing the difficulty of servicing the apparatus.

It is accordingly a principal object of the present invention to provide an improved cooling system for electrical power supply apparatus which overcomes the disadvantages present in cooling systems of the type heretofore employed.

Another object of the present invention is to provide an improved cooling system for an electrical power supply apparatus employing a combination heat exchanger and conductive heat sink device through which a coolant is circulated effecting rapid heat removal of the heat generating electrical components mounted thereon, and simultaneous cooling of air circulated thereover for cooling the remaining components within the enclosure.

Still another object of the present invention is to provide an improved rectifier apparatus incorporating an improved cooling system therein which is of simple design, of simple, low cost and efficient operation, of compact size, and which provides a high degree of flexibility and versatility in the location of the components within the enclosure providing optimum cooling thereof.

A further object of the present invention is to provide an improved combination unit comprising a heat exchanger and conductive heat sink for transmitting electrical current rectified by a plurality of crystal-type diodes mounted thereon and concurrently removing the heat generated by the diodes and cooling circulating air passing thereover for use in cooling the remaining electrical components within the electrical power apparatus.

A still further object of the present invention is to provide an improved method and apparatus for effecting efficient cooling of electrical power supply apparatuses which is of versatile use, of economical manufacture, and of simple and durable operation.

The foregoing and other objects and advantages of the present invention are achieved by employing a combination unit comprising a heat exchanger and an electrically conductive heat sink which includes a web portion provided with a plurality of apertures therein for removably mounting a series of semi-conductor cells such as, for example, crystal-type diodes, Zener diodes, silicon controlled rectifiers (SCR), transistors, and the like in electrical and heat conductive contact therewith. The web portion of the combination unit is formed with at least one passageway therein through which a coolant is adapted to be circulated and is formed with a plurality of fins along at least one edge thereof adapted to be disposed in contact with air passing thereover for extracting heat from the air effecting a cooling thereof for use in cooling other components of an electrical power apparatus associated therewith. The term "coolant," as herein employed, encompasses gaseous as well as liquid coolants including water, refrigerants, or the like. The term "air" as herein employed, encompasses gases, including conventional air as well as inert gases such as nitrogen, carbon dioxide, as well as mixtures thereof.

Other objects, features and advantages of the present invention will become apparent from the subsequent description and the appended claims, taken in conjunction with the accompanying drawings, in which:

Figures 1, 2:
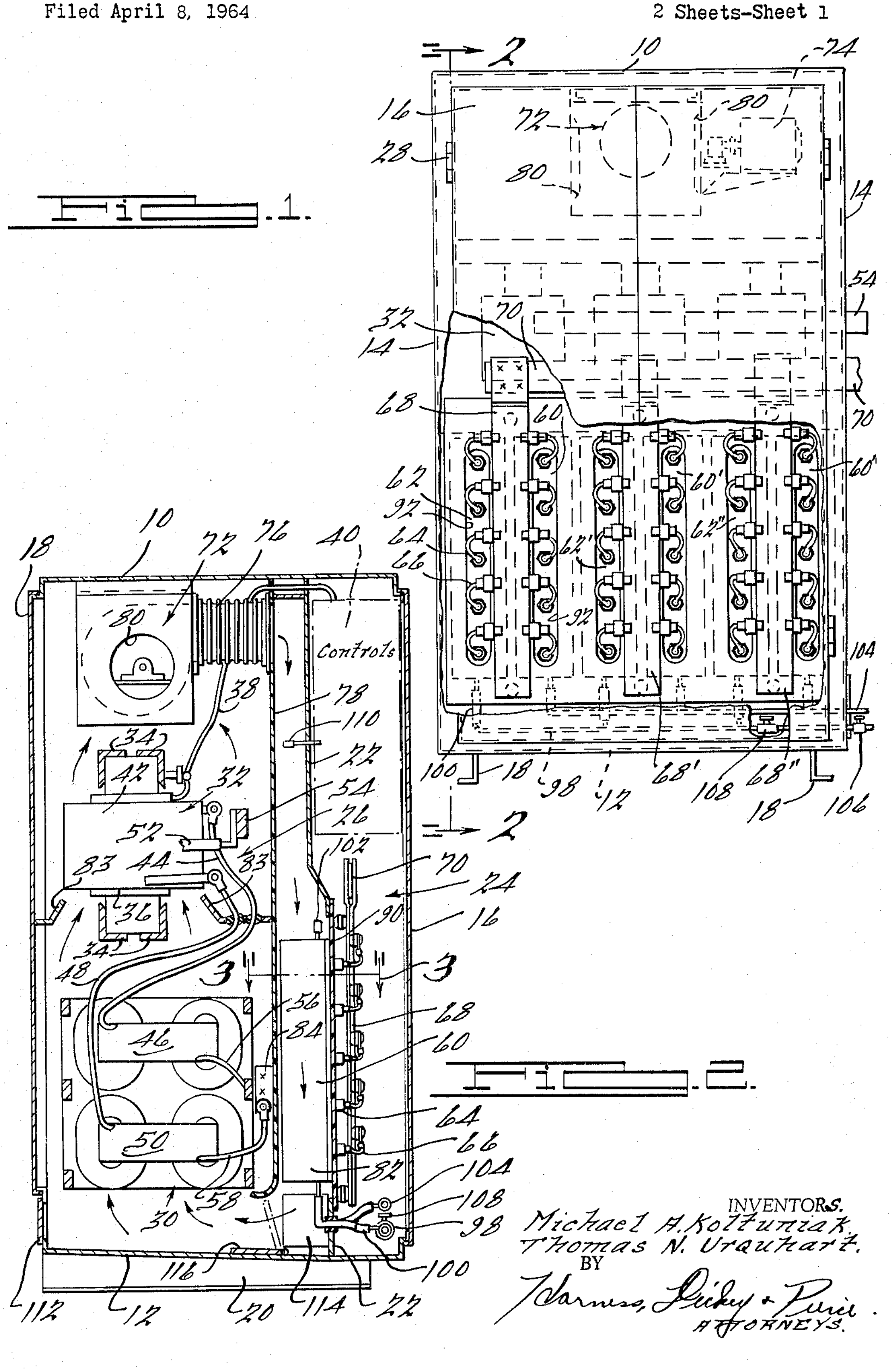
FIGURE 1 is a front elevation view of a typical rectifier apparatus to which the present invention is applicable with portions of the front panel thereof removed, exposing the interior arrangement of a plurality of combination heat exchangers and electrically conductive heat sinks having a plurality of diodes mounted thereon in electrical and heat conductive contact therewith.
FIGURE 2 is a vertical transverse sectional view of the rectifier apparatus shown in FIGURE 1 and taken along the line 2—2 thereof.
Figure 3:
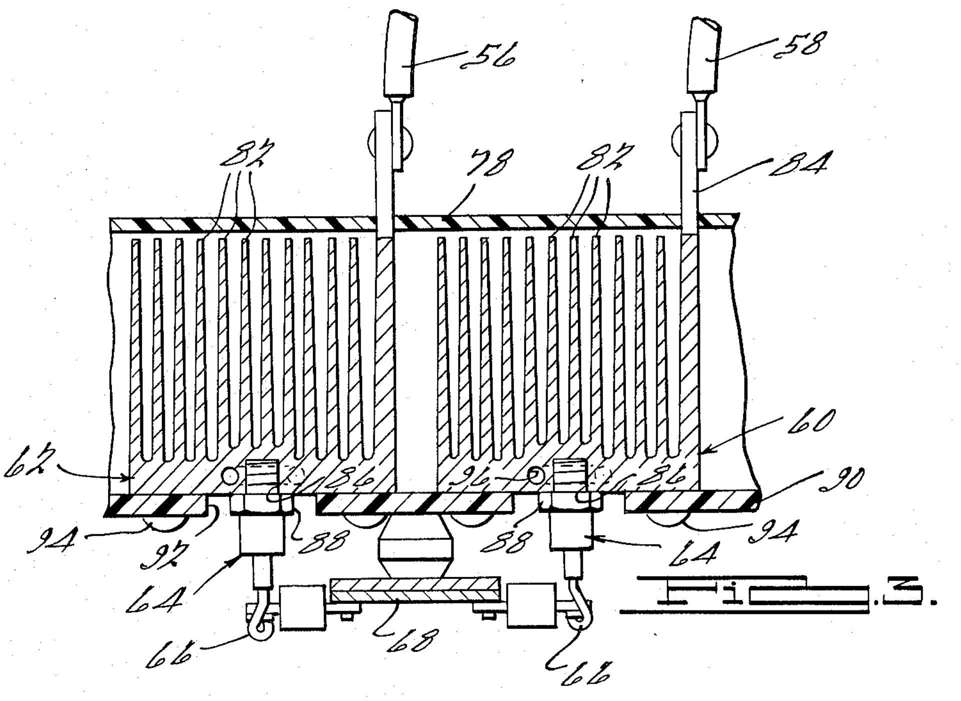
Figure 4:
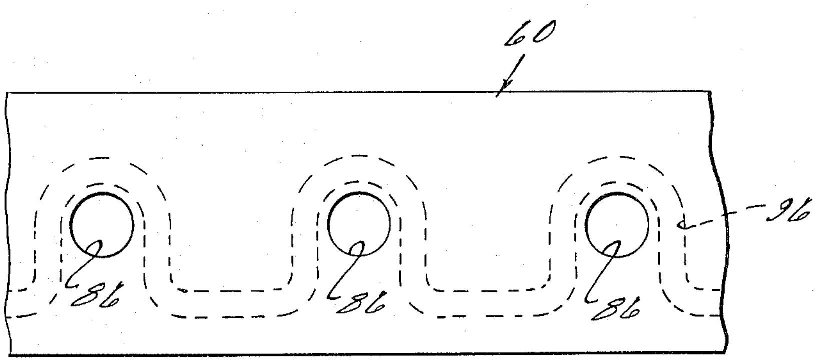

FIGURE 3 is a transverse horizontal sectional view through the combination heat exchanger and electrically conducted heat sink as shown in FIGURE 2 and taken along the line 3—3 thereof, and FIGURE 4 is a fragmentary plan view of the web portion of a combination heat exchanger and electrically conductive heat sink illustrating a serpentine arrangement of the cooling passages therethrough relative to the mounting apertures for the diodes.

Referring now in detail to the drawings and as may be best seen in FIGURES 1 and 2, a typical power supply apparatus to which the present invention is applicable comprises a suitable three-dimensional enclosure such as of sheet steel including a top panel 10, a bottom panel 12, a pair of side panels 14, a pair of hingedly mounted front panels 16 and a removably secured rear panel 18. A pair of spaced-apart angle members 20 are rigidly secured to the bottom panel 12 serving as a supporting base structure for the enclosure. Suitable angle iron reinforcing elements may be secured to the individual panels effecting further rigidification thereof as may be desired. The individual panels comprising the enclosure are joined to each other in a manner to minimize leakage of air or other gases into and out of the interior of the enclosure.

The interior of the enclosure is divided into two compartments by a vertically and transversely extending partition 22 as best seen in FIGURE 2, defining a front compartment indicated at 24 and a rear compartment indicated at 26. The manner of the connections between the several panels comprising the enclosure and the partition 22 is preferably made so that the rear compartment 26 comprises a hermetically sealed chamber which may be filled with air devoid of any corrosive vapors or alternatively with an inert gas such as nitrogen or carbon dioxide, for example, minimizing oxidation attack of the electrical components and providing for improved heat exchange and cooling of the electrical components therein. The rear panel 18 is removably mounted in order to gain access to the interior of the rear compartment 26, enabling inspection and service of the several components therein as may be required from time to time. Similarly, the front panels 16 are hingedly mounted such as by means of hinges 28 as indicated in FIGURE 1 providing ready accessibility to the interior of the front compartment 24 for inspection and service of the controls and other components therein. The points of connection of the front and rear panels to the enclosure are preferably provided with a suitable resilient gasketing material in order to maintain a substantial air-tight integrity of the interior of the front and rear compartments.

The exemplary power supply apparatus illustrated in the drawings comprises a three-phase alternating current rectifier unit for supplying low-voltage, high-amperage direct current suitable for use in a variety of processes including electroplating and anodizing processes of metallic workpieces. The specific embodiment of the rectifier illustrated is of the regulated type employing a saturable core reactor indicated at 30 which is mounted in the rear compartment 26, enabling selected control of the output voltage of the rectifier unit. The saturable core reactor comprises a variable impedance device which is disposed between the secondary coil of the rectifier transformer and the crystal-type diode. It consists of an iron core reactor with an additional control winding through which a control current is passed, causing changes in the impedance of the reactor and corresponding changes in the output of the rectifier. Alternative suitable regulatory controls of the types well known in the art, including tap selector switches, variable transformers, induction regulators, and silicon controlled rectifier regulators can be satisfactorily employed in lieu of the saturable core reactor 30. The present invention is also applicable to so-called uncontrolled rectifier apparatuses which provide for a substantially constant output voltage.

The internal components of the rectifier apparatus as illustrated in FIGURES 1 and 2 include a three-phase transformer indicated at 32 which is supported by means of four transversely extending angle iron braces 34 approximately midway within the rear compartment 26. Each transformer phase is provided with a primary coil 36 which is connected by conductors 38 to a supply of alternating current connected to the control panel 40 indicated in phantom in FIGURE 2 which is positioned in the upper portion of the front compartment 24. Each phase of the transformer 32 is also provided with a secondary coil 42, one end of which is connected by means of a lead 44 to one end of a coil 46 of the saturable core reactor 30 and the other end of which is connected by means of a lead 48 to a second coil 50 of the saturable core reactor 30. The secondary coil 42 is provided with a center tap connected by a lead 52 which is electrically connected to a bus bar 54 which represents the positive terminal of the power supply apparatus. The other ends of the coils 46, 50 of the saturable core reactor 50 are connected respectively by leads 56, 58 to a pair of combination heat exchangers and electrically conductive heat sinks indicated at 60 and 62 respectively on which a plurality of crystal-type diodes 64 are mounted in electrical and heat conducting contact therewith. Each of the diodes 64 is in turn provided with a pigtail lead 66 which is electrically connected to a vertical collector bus 68 which in turn is electrically connected to its upper end to a negative output bus 70 which extends transversely of the front compartment 24 and projects from the right side of the enclosure as viewed in FIGURE 1. The load, such as a rack of workpieces to be electroplated is electrically connected to the negative output bus 70 while the anodes immersed in the electroplating solution are electrically connected to the positive bus bar 54.

Similar pairs of the combination heat exchanger and electrically conductive heat sink, hereinafter referred to as combination units, are provided for the other two phases of the three-phase alternating current and are designated in FIGURE 1 as 60′, 62′ and 60″ and 62″. The combination units 60′, 60″, 62′ and 62″ are similarly provided with a plurality of diodes 64, which are electrically connected to collector buses 68′ and 68″ that are connected at their upper ends to the negative output bus 70.

Of the foregoing electrical components, the diodes 64 which may comprise any of the well-known and commercially available rectifying cells employing semi-conductor materials such as selenium or silicon diodes, are most susceptible to overheating during operation of the rectifier apparatus. Overheating of the diodes for prolonged periods of time results in an impairment in their efficiency and an appreciable reduction in their useful operating life. The three-phase transformer 32, saturable core reactor 30, and the various controls and meters in the control panel 40 which include circuit breakers and main fuses, main contactor, controls for the saturable core reactor, etc., are less subject to overheating during operation. Conventionally, the specific meters and controls incorporated in the control panel require no ancillary cooling system due to the relatively minimal generation of heat caused thereby during operation. On the other hand, the transformer and saturable core reactor do generate some heat during their operation, necessitating a removal thereof to prevent overheating which would otherwise cause an impairment in their operating efficiency and a reduction in their useful operating life. The efficiency of the cooling provided by the present invention of both the diodes, transformer and ancillary electrical components enables the power rectifier apparatus to be operated at substantially high output currents without hazard of overheating thereof.

In accordance with the cooling system comprising the present invention, the high rate of heat dissipation of each of the diodes 64 is rapidly removed by a cooling fluid passing through the combination units on which they are mounted and the remaining components of the rectifier apparatus are cooled by a recirculating flow of gas positioned in heat exchange relationship relative to the combination units. Recirculation of the cooling gas in the rear compartment 26 is achieved by means of a blower 72 driven by a motor 74 suspended from the underside of the top panel 10 of the enclosure. The discharge side of the blower 72 is connected by means of a flexible duct 76 which is connected to the upper end of a vertical duct formed by a vertically extending baffle 78 which extends transversely between the side panels 14 of the enclosure and is spaced inwardly from the partition 22. The lower end of the vertical baffle 78 is preferably rounded and terminates at a point spaced from the bottom panel 12 through which the air is discharged and passes upwardly through and around the coils of the saturable core reactor and the three-phase transformer. The air is constantly withdrawn from the upper end of the rear compartment through a pair of inlet ports 80 in each side of the housing of the blower 72.

In accordance with the foregoing arrangement, the gas within the rear compartment 26 which may comprise air, nitrogen, carbon dioxide, etc., is continuously recirculated over the electrical components and is subsequently cooled on coming in contact with the combination units positioned within the vertical duct formed between the vertical baffle 78 and partition 22 whereupon it is again discharged and passes over the electrical components effecting a cooling thereof. Increased efficiency in the removal of heat from the electrical components can be achieved by providing suitable baffles in the rear compartment such as the baffles 83 positioned below the transformer 32, increasing the effectiveness of the cooling air by controlling its direction relative to the critical components of the electrical apparatus. The cooling gas in the rear compartments, which is hermetically sealed from the outside, may be at a pressure slightly above surrounding atmospheric pressure to prevent inward leakage or breathing of the enclosure, avoiding entry of any contaminating or corrosive fumes.

The dual function of the combination heat exchanging and electrical conductive units 60, 60′, 60″, 62, 62′ and 62″ are achieved by a construction as is best seen in FIGURES 3 and 4. As illustrated in these drawings, the combination units comprise an elongated structure comprising a web portion to which a plurality of fins indicated at 82 are integrally affixed and extend therealong in spaced substantially parallel relationship. The number and length of the fins 82 is controlled so as to provide for a substantial increase in the surface area of the combination unit enhancing its heat exchange efficiency with the gas passing thereover. The combination units are composed of a suitable metal such as copper, copper base alloys, aluminum, and aluminum base alloys, for example, which possess good heat and electrical conductivity properties. The combination units are preferably fabricated by casting or extrusion forming an integral structure. One of the fins 82 is provided with an extension 84 to which an electrical lead such as the leads 56, 58 are electrically connected for transmitting electrical current from the transformer or from the saturable reactor 30, if employed, to the diodes 64 mounted on the combination unit. The extensions 84 of the combination units project through the vertical baffle 78 adjacent to the major electrical components facilitating connection thereto.

The web portion of the combination units is provided with a series of tapped bores 86 disposed in spaced intervals therealong in which the shank portions of the diodes are disposed in threaded engagement forming the intimate heat and electrical contact therewith. The specific diodes 64 as shown in FIGURE 3 are formed with a hexagonal shoulder indicated at 88 to facilitate a gripping thereof with a wrench as required during installation and removal of the diodes. The shoulder surface of the hexagonal portion 88 is adapted to overlie and be disposed in intimate electrical and heat conducting contact with the surface of the web section of the combination unit further facilitating electrical and heat conductive contact with the combination unit. It is also contemplated within the scope of the present invention that the combination units can be formed with the fins 82 recessed in the areas adjacent to each of the tapped bores 86 in order that diodes can be employed having a threaded shank portion which are adapted to be clamped between the web portion by means of a nut threadably engaged on the projecting end of the shank. It will also be appreciated that the length of the combination unit, the number and size of the fins 82 and the number of diodes mounted thereon can be varied consistent with the electrical current being conducted and the capacity of each individual diode so as to provide the requisite rectification capacity.

The combination units are supported in appropriate relationship within the vertical duct defined by the vertical baffle 78 and partition 22 by means of a slotted panel 90 of an electrically insulating material which is disposed with its edges in overlying sealed relationship against the surfaces of the partition 22 maintaining an air-tight integrity of the rear compartment 26. The slotted panel 90 is formed with a series of vertical apertures indicated at 92 through which the aligned series of diodes 64 project into the front compartment 24 of the enclosure. Each of the combination units are suitably affixed to the slotted panel 90 such as by means of screws 94 maintaining them in appropriate alignment with the relative direction of flow of the cooling gas.

The combined cooling effect of the diodes 64 and of the cooling gas passing over the fins 82 of the combination units is provided by the circulation of a suitable cooling fluid such as water, or a suitable liquid or gaseous refrigerant through passageways indicated at 96 extending through the web portion of the combintion unit adjacent to the tapped bores 86. The passageways 96 may be arranged in any suitable pattern such as the serpentine pattern indicated in FIGURE 4 in which the passageway is disposed in close proximity to the tapped bores 86 facilitating the removal of heat from the adjacent region of the web portion preventing overheating of the diodes mounted therein. In addition to extracting heat from the combination unit in an area adjacent to the tapped bores 86, the circulation of cooling fluid additionally effects extraction of heat from the projecting fins 82 thereon causing a temperature differential between fins and the gas passing thereover effecting concurrent extraction of heat from the cooling gas with a corresponding reduction in the temperature thereof.

The cooling fluid supplied to the combination units may be provided through a conduit system as exemplarly shown in FIGURES 1 and 2 comprising a supply conduit 98 connected by flexible insulating hose sections 100 to suitable nipples affixed to the base alternate ones of the combination units. The pressurized cooling fluid accordingly passes upwardly through the combination unit and may conveniently be transferred to the upper end portion of the adjacent one of the pair of combination units by a bridge conduit 102 of an electrically insulated material. The cooling fluid thereafter passes downwardly through the combination unit and is removed at the base thereof through an exhaust conduit 104. The supply conduit 98 and the exhaust conduit 104 extend transversely across the base of the front compartment 24 and project outwardly of the right side of the enclosure as viewed in FIGURE 1. The supply conduit 98 may be provided with a suitable shutoff valve 106 mounted exteriorly of the compartment and a flow control valve 108 which is operative in response to a temperature-sensing element such as a sensing element 110 disposed in the vertical duct at the outlet of the blower for increasing or decreasing the flow of cooling fluid consistent with fluctuations in the temperature of the circulating cooling gas. The flow control valve 108 may be of any one of the various types well known in the art including motorized flow control valves which are operable in response to suitable temperature-sensing devices maintaining fairly close control of the temperature of the circulating cooling gas and thereby assuring adequate cooling of the electrical components in spite of large fluctuations in operating load of the rectifier apparatus.

In accordance with the arrangement of the cooling system as hereinbefore described, adequate cooling of the diodes and of the ancillary electrical components of the apparatus can be achieved by the use of conventional tap water circulated through the combination units which upon discharge from the unit may be sent through a suitable cooling power, or preferably to water rinse stations of the processes, such as an electroplating process with which the rectifier apparatuses are associated. It is also contemplated that suitable refrigerants such as Freon, for example, can be employed which are supplied from a suitable refrigeration apparatus providing for a self-contained cooling system.

It is also contemplated within the scope of the present invention that the rectifier unit under periods of relatively low load or during failure of the fluid cooling system can be operated as a conventional air-circulated rectifier cooling system by removing a rear panel 112 at the base of the rear panel 18, as shown in FIGURE 2, admitting air into the rear chamber 26 which is drawn upwardly by the blower 72 and passes downwardly over the fins of the combination unit. The resultant air is conveniently exhausted from the rear compartment by means of a removably secured side panel 114 as illustrated in FIGURES 1 and 2. A movable baffle 116 as shown in FIGURE 2 may also be provided which is moved from the position as shown in solid lines to the position as shown in phantom in FIGURE 2, effecting a closure of the outlet end of the vertical duct assuring substantially complete exhausting of the air out through the port created by the removal of the side panel 114.

It is further contemplated in accordance with the teachings of the present invention that similar semi-conductor cells such as Zener diodes, silicon controlled rectifiers (SCR), transistors, or the like may also be mounted individually or in series on the combination units as may be desired for providing regulatory control of the power output of the electrical apparatus. In such case, cooling of such other semi-conductor cells is achieved in the same manner as previously described and a suitable heat exchanging gas is passed over the finned portions of the combination units providing for cooling of other related equipment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical apparatus, the combination including a substantially sealed enclosure containing electrical components therein, an electrically conductive member formed with a plurality of fins disposed in heat conductive contact therewith and positioned with closure, a semi-conductor cell mounted on said member in heat and electrical conductive contact therewith, said member formed with a passageway therein, means for passing a cooling fluid through said passageway for removing heat from said member and said fins thereon, and means for passing a heat exchanging gas over said fins for removal of heat from said gas and for circulating the cooled said gas through said enclosure and in cooling relationship over the electrical components therein.

2. In an electrical apparatus, the combination including a substantially sealed enclosure containing electrical components therein, an electrically conductive member comprising a web portion and a plurality of fins integrally connected to said web portion and projecting therefrom, said member positioned with at least said fins disposed within said enclosure, a semi-conductor cell mounted on said web portion in electrical and heat conductive contact therewith, said web portion formed with a passageway therein extending in close proximity to said cell mounted thereon, means for passing a cooling fluid through said passageway for removing heat from said web portion and said fins thereon, and means for passing a heat exchanging gas within said enclosure over said fins for removal of heat therefrom and for circulating the cooled said gas through said enclosure and in cooling relationship over the electrical components therein.

3. In an electrical rectifying apparatus, the combination including an enclosure, a partition dividing said enclosure into a first compartment and a substantially sealed second compartment, containing electrical components therein, an electrically conductive member formed with a plurality of fins disposed in heat conductive contact therewith mounted in electrically insulated relationship on said partition with said fins thereof projecting into said second compartment, a plurality of diodes mounted on said member in electrical and heat conductive contact therewith conductor means in said first compartment electrically connected to said diodes, said member formed with a passageway therein, means for passing a cooling fluid through said passageway for removing heat from said member and said fins thereon, a heat exchange gas in said second compartment, and means for circulating said gas over said fins for removal of heat therefrom and for directing said gas in cooling relationship over said electrical components.

4. In an electrical rectifying apparatus, the combination including an enclosure, a partition dividing said enclosure into a first compartment and a substantially sealed second compartment, a transformer positioned in said second compartment, an electrically conductive member including a web portion formed with a plurality of fins integrally connected to and projecting from said web portion mounted in electrically insulated relationship on said partition and with said fins thereof projecting into said second compartment, a plurality of diodes mounted on said member in electrical and heat conductive contact therewith conductor means in said first compartment electrically connected to said diodes, said web portion formed with a passageway therein, means for passing a cooling fluid through said passageway for removing heat from said web portion and said fins thereon, a heat exchanging gas in said second compartment, guide means in said second compartment for guiding the direction of flow of said heat exchanging gas, and means for circulating said heat exchanging gas within said second compartment effecting movement thereof over said fins for removal of heat therefrom and thereafter over said transformer in cooling relationship relative thereto.

5. In an electrical rectifying apparatus, the combination including an enclosure, a partition dividing said enclosure into a first compartment and a substantially air tight second compartment, a transformer positioned in said second compartment, an electrically conductive member including a web portion formed with a plurality of fins integrally connected to and projecting from said web portion mounted in electrically insulated relationship on said partition and with said fins thereof projecting into said second compartment, a plurality of diodes mounted on said member in electrical and heat conductive contact therewith conductor means in said first compartment electrically connected to said diodes, said web portion formed with a passageway therein, means for passing a cooling fluid through said passageway for removing heat from said web portion and said fins thereon, a heat exchanging gas in said second compartment, guide means in said second compartment for guiding the direction of flow of said heat exchanging gas, means for circulating said heat exchanging gas within said second compartment effecting movement thereof over said fins for removal of heat therefrom and thereafter over said transformer in cooling relationship relative thereto, and control means for controlling the quantity of said cooling fluid passing through said passageway in response to the temperature of said heat exchanging gas within said second compartment.

References Cited by the Examiner

UNITED STATES PATENTS

| | | | |
|---|---|---|---|
| 2,412,989 | 12/1946 | Kotterman. | |
| 2,757,518 | 8/1956 | Schofield -------- | 165—107 X |
| 3,007,088 | 10/1961 | Diebold. | |

ROBERT A. O'LEARY, *Primary Examiner.*

N. R. WILSON, *Assistant Examiner.*